US009214826B2

United States Patent
Skipper

(10) Patent No.: US 9,214,826 B2
(45) Date of Patent: Dec. 15, 2015

(54) ALTERNATING BATTERY POWER SUPPLY SYSTEM WITH INTER-BATTERY CHARGING AND RATE OF DISCHARGE MANAGEMENT

(71) Applicant: Clint L. Skipper, Irvington, AL (US)

(72) Inventor: Clint L. Skipper, Irvington, AL (US)

( * ) Notice: Subject to any disclaimer, the term of this patent is extended or adjusted under 35 U.S.C. 154(b) by 203 days.

(21) Appl. No.: 14/078,776

(22) Filed: Nov. 13, 2013

(65) Prior Publication Data
US 2014/0217986 A1 Aug. 7, 2014

Related U.S. Application Data

(60) Provisional application No. 61/761,233, filed on Feb. 6, 2013.

(51) Int. Cl.
*H02J 7/00* (2006.01)

(52) U.S. Cl.
CPC .............. *H02J 7/0057* (2013.01); *H02J 7/0068* (2013.01); *H02J 7/0085* (2013.01); *H02J 2007/0059* (2013.01)

(58) Field of Classification Search
CPC ..... H02J 7/0057; H02J 7/0068; H02J 7/0085; H02J 2007/0059
USPC .......................................................... 320/134
See application file for complete search history.

(56) References Cited

U.S. PATENT DOCUMENTS

| 5,600,224 A * | 2/1997 | Mody et al. .................... 320/106 |
| 5,739,671 A * | 4/1998 | Hamada ......................... 320/149 |
| 2010/0231175 A1* | 9/2010 | Noda ............................. 320/162 |

\* cited by examiner

*Primary Examiner* — Vuthe Siek

(57) ABSTRACT

A battery power supply system using a DC-DC step-up converter to increase voltage supplied from a battery in a load state. Output from the DC-DC step-up converter powers a load and supplies charging to a battery in a charge state. Each of a plurality of batteries is cycled between load and charge states. Thus, each battery supplies power to the DC-DC step-up converter to power the load and charging for another battery. Additionally, each battery receives a charge from the DC-DC step-up converter. A microcontroller and relays control the states and switching.

27 Claims, 6 Drawing Sheets

ALTERNATING BATTERY POWER SUPPLY SYSTEM WITH INTER-BATTERY CHARGING AND RATE OF DISCHARGE MANAGEMENT

PRIORITY CLAIM

This application claims the benefit of previously filed U.S. Provisional Patent Application entitled "Battery Management and Charging System," assigned U.S. Ser. No. 61/761,233, filed Feb. 6, 2013, and which is incorporated herein by reference for all purposes.

FIELD OF THE SUBJECT MATTER

This presently disclosed subject matter pertains to batteries, and, more particularly, to a battery power supply management system (hereinafter sometimes referred to as the "System") that provides power to a load by alternating between a plurality of batteries, supplies charging to an idle battery from the battery powering the load, and which by doing so, prolongs battery life (by decreasing the rate of discharge).

BACKGROUND OF THE SUBJECT MATTER

Prolonging battery life is a key concern for many industries and consumers today. As used herein, "battery life" refers to how long a battery (or bank of batteries) can power a load on a single charge cycle. In contrast, "lifetime" of a battery refers to the number of charge/discharge cycles of a rechargeable battery until the battery has naturally degraded irreversibly and can no longer hold enough charge to be useful.

A few non-limiting examples of industries affected by limited battery life are automotive, aerospace, marine, and backup power. For instance, electric vehicles have an unappealing limited range due to battery capacity limitations. More motorists would choose electric vehicles if vehicle range was greater and electrical vehicle cost was more competitive with conventional internal combustion engine vehicles. Battery backup power supplies for homes are unpopular due to limited capacity and cost. Instead, many homeowners prefer noisy, fume-emitting, gas-guzzling generators over battery power to endure a blackout. Anglers must carry extra batteries or judiciously limit their trolling motor usage to endure a fishing trip. As a consequence, batteries of battery powered devices frequently must be replaced or recharged, which can be time consuming, or require a generator, or access to utility power, or extra batteries, etc. There are countless other examples where appeal or usefulness is negatively impacted by battery life limitations.

A battery's "capacity" is the amount of electric charge it can deliver measured in relation to a certain stated voltage. Battery capacity may be considered in terms of state of charge. State of charge may be viewed as available capacity expressed as a percentage of a benchmark reference, such as the rated capacity of a battery or the current capacity of a battery (i.e. the maximum capacity a battery will attain when fully charged at any given point in time). Basing the state of charge on the current capacity of the battery rather than its rated capacity (which only applies when the battery is new) reveals the progressive reduction in capacity over the lifetime of a battery. Either way, a desire is to maintain a battery at a high state of charge for as long as possible before capacity falls below the minimum required to accomplish the task (powering a given load) it has been applied to. In doing so, battery life (i.e. useable capacity) is extended.

Of significance, as the state of charge decreases, voltage decreases. Additionally, the more state of charge decreases, the more rapidly voltage decreases. This is evident in the exemplary state of charge vs. voltage curve for a conventional lead acid battery, as provided in FIG. 1 (labeled as Prior Art since it represents a typical performance curve of a known or conventional lead acid battery). Maintaining a battery in a state of charge above about 60% for as long as possible during discharge will appreciably increase the utility of the battery by avoiding or postponing the most extreme decline in voltage. Below a certain voltage, the battery becomes useless because it is unable to efficiently power a motor, or illuminate a light, or deliver sufficient power for some other load to function. Certain loads, e.g. motors, will operate inefficiently or will not operate at all, and can even be damaged below a minimum voltage. Deep discharging also tends to shorten the lifetime of a battery.

What is needed is a durable, reliable, cost-effective, scalable system that appreciably extends battery life for a wide range of applications, without compromising the lifetime of the battery. Ideally, such a system would extend the lifetime of the battery.

The presently disclosed subject matter is directed to overcoming one or more of the problems and solving one or more of the needs as set forth above.

SUMMARY OF THE SUBJECT MATTER

To solve one or more of the problems set forth above, in an exemplary implementation of the presently disclosed subject matter, a battery power supply may include a DC-DC step-up converter having a power input and a power output, the DC-DC step-up converter receiving an input current at an input voltage through the power input and delivering an output current at an output voltage at the power output, the output voltage being greater than the input voltage. A load may be electrically coupled to the power output. A plurality of rechargeable batteries, including a first battery and a second battery, may be provided. Two pairs of relays may be associated with and electrically coupled to each battery. Each relay may be switchable from an activated state which makes (completes) a circuit through the relay and a deactivated state that breaks the circuit through the relay. Each pair of relays may include a load relay and a charge relay for each battery.

The load relay for a battery electrically couples the battery to the power input of the DC-DC step-up converter when the load relay is in the activated state. The charge relay for a battery electrically couples the battery to the power output of the DC-DC step-up converter when the charge relay is in the activated state. The load relay for the battery is not in the activated state when the charge relay for that same battery is in the activated state. The charge relay for the battery is not in the activated state when the load relay for that same battery is in the activated state. The load relay for the second battery is in a deactivated state when the load relay for the first battery is in the activated state. The load relay for the first battery is in a deactivated state when the load relay for the second battery is in the activated state. The charge relay for the second battery is in a deactivated state when the charge relay for the first battery is in the activated state. The charge relay for the first battery is in a deactivated state when the charge relay for the second battery is in the activated state.

A microcontroller is communicatively coupled to each of the relays and configured to selectively supply control signals to each relay. The microcontroller sends control signals that "instruct" the relays to continuously cycle between a first configuration and a second configuration by switching between activated states and deactivated states. Cycling to the first configuration occurs when a switching event is detected in the second configuration. Cycling to the second configuration occurs when a switching event is detected in the first configuration. A switching event may be the consequence of a determined period of time, detection of a certain voltage level in one of the batteries, detection of battery voltage below a determined limit in one of the batteries, detection of battery voltage above a determined limit in one of the batteries, or detection of some other condition or event that has been determined to warrant cycling.

In a first exemplary configuration, the microcontroller supplies a load control signal to each load relay. At start up, all relays are in the deactivated state and the load control signal switches the load relay for the first battery to the activated state and the load relay for the second battery to the deactivated state. The microcontroller then supplies a charge control signal to each charge relay. The charge control signal switches the charge relay for the second battery to the activated state (while the load relay for the first battery is in the activated state) and the charge control relay for the first battery to the deactivated state (while the load relay for the second battery is in the deactivated state). In the first configuration, the load relay for the first battery electrically couples the first battery to the power input of the DC-DC step-up converter when the load relay for the first battery is in the activated state, and the charge relay for the second battery electrically couples the second battery to the power output of the DC-DC step-up converter when the charge relay for the second battery is in the activated state. In the first configuration (when the charge relay for the second battery is in the activated state) while the power output of the DC-DC step-up converter powers the load, the second battery, unless fully charged, receives charging from the power output of the DC-DC step-up converter. Upon the occurrence of a switching event, determined by the microprocessor, control signals are sent to the relays to initiate a transition to the second configuration.

In a second exemplary configuration, the microcontroller supplies a load control signal to each load relay. The load control signal switches the load relay for the second battery to the activated state and switches the load relay for the first battery to the deactivated state. Also in the second configuration, the microcontroller supplies a charge control signal to each charge relay. The charge control signal switches the charge relay for the second battery to the deactivated state (while the load relay for the second battery is in the activated state) and the charge relay for the first battery to the activated state (while the load relay for the first battery is in the deactivated state). In the second configuration, the load relay for the second battery electrically couples the second battery to the power input of the DC-DC step-up converter when the load relay for the second battery is in the activated state, and the charge relay for the first battery electrically couples the first battery to the power output of the DC-DC step-up converter when the charge relay for the first battery is in the activated state. In the second configuration, while the power output of the DC-DC step-up converter powers the load, the first battery, unless fully charged, receives charging from the power output of the DC-DC step-up converter when the charge relay for the first battery is in the activated state. Upon the occurrence of a switching event, determined by the microprocessor, control signals are sent to the relays to initiate a transition to the first configuration.

Cycling between the first configuration and the second configuration continues until the microprocessor detects a termination event and sends a control signal to the relays to end the process. The microcontroller can deactivate all relays upon the occurrence of a termination event. A termination event may include detection of voltage below a determined limit in one of the batteries, detection of voltage above a determined limit in one of the batteries, a determined period of time, or some other event or condition deemed to warrant termination.

Power is conditioned before being supplied to the load and the second battery in the first state and before being supplied to the load and the first battery in the second state. A power conditioner is electrically coupled to the power output of the DC-DC step-up converter between the power output and between the charge relays. Thus, the output of the DC-DC step-up converter received by the load, and each charge relay when in an activated state, is conditioned both as to output current and output voltage. The "conditioned" output current and output voltage are tailored to provide the load with power that is optimized to maximize performance and longevity.

A diode electrically coupled between the load relays and the DC-DC step-up converter allows current to pass directionally from the load relays to the DC-DC step-up converter and impedes current from passing from the DC-DC step-up converter to the load relays.

BRIEF DESCRIPTION OF THE DRAWINGS

The foregoing and other aspects, objects, features and advantages of the presently disclosed subject matter will become better understood with reference to the following description, appended claims, and accompanying drawings, whereby a full and enabling disclosure of the present subject matter, including the best mode thereof, directed to one of ordinary skill in the art, is set forth in the specification, which makes reference to the appended figures, in which:

Those skilled in the art will appreciate that the figures are not intended to be drawn to any particular scale; nor are the figures intended to illustrate every embodiment of the presently disclosed subject matter. The presently disclosed subject matter is not limited to the exemplary embodiments depicted in the figures or the specific components, steps, configurations, shapes, relative sizes, ornamental aspects or proportions as shown in the figures.

DETAILED DESCRIPTION OF THE SUBJECT MATTER

Figure 1:
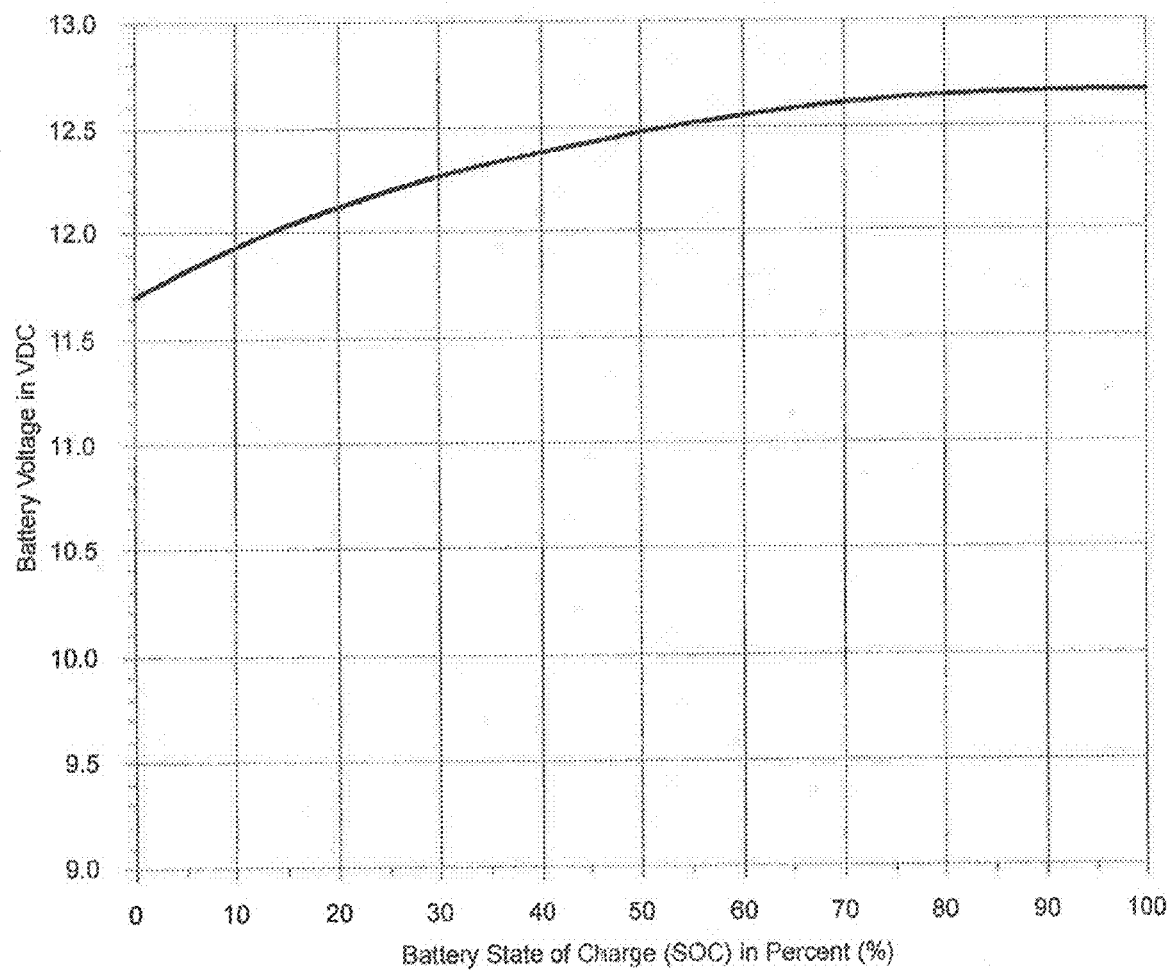
FIG. 1 represents a typical performance curve of a known or conventional lead acid battery.
Figure 2A:
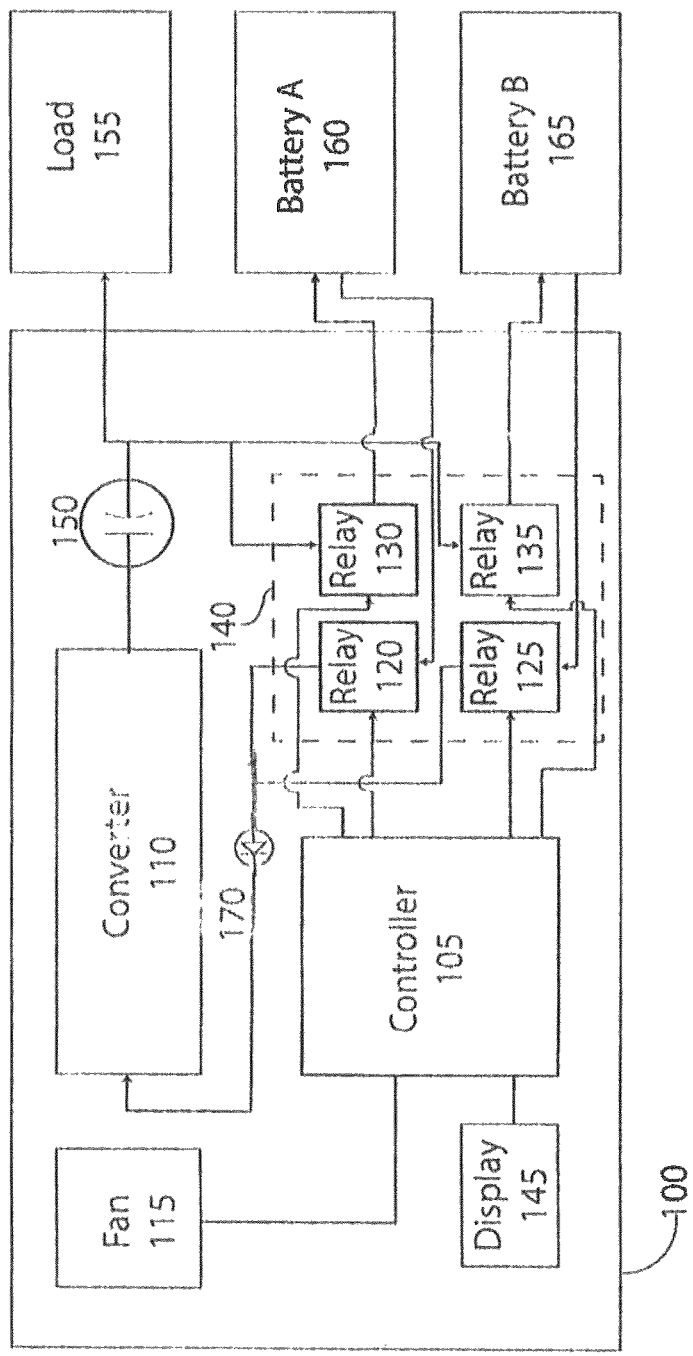
FIG. 2A is a high level block diagram of an exemplary alternating battery power supply with inter-battery charging circuit according to principles of the presently disclosed subject matter.

Referring to FIG. 2A, a high level block diagram shows an exemplary alternating battery power supply with inter-battery charging circuit 100 according to principles of the presently disclosed subject matter. A microcontroller 105 controls load and charge relays 120-135 for each battery according to a switching algorithm. A load relay 120, 125 associated with each battery 160, 165 periodically receives control signals from the microcontroller 105, which controls when a battery 160, 165 is coupled to the input of a DC-DC step-up converter 110. A battery 160, 165 is in active mode when connected to the input of the converter 110 by an activated load relay 120, 125. The converter 110 alternately receives power from one of a plurality (e.g. two) of batteries 160, 165 when the battery is in active mode. A battery 160, 165 not connected to the input of the converter 110 is in an idle mode. A load 155 may be powered by output from the converter 110. A charge relay 130, 135 associated with a battery 160, 165 periodically receives control signals from the microcontroller 105, which controls when a battery 160, 165 is coupled to the output of the converter 110. When in idle mode and not fully charged, a battery 160, 165 receives charging by being coupled to the output of the converter 110 by the associated charge relay 130, 135. A higher state of charge is maintained by a battery 160, 165 receiving periodic charging when coupled to the output of the converter 110 resulting in an appreciable increase in battery life. Switching events alternate each battery 160, 165 between active and idle modes until a termination event occurs. A switching event may result from a low voltage limit being reached, a determined timing sequence, or other sensed parameter determined to warrant switching. A termination event may result from a low voltage limit condition, a high voltage limit condition, a determined timing sequence, or based upon other sensed parameters deemed to warrant termination of the process. Upon a termination event, all relays 120-135 are deactivated and the batteries 160, 165 cease providing power to the converter 110. Such aspects of the circuit are discussed more fully herein.

At least two rechargeable batteries 160, 165 are provided, as illustrated on the right side of FIG. 2A. Each battery shown in FIG. 2A may represent a battery bank comprising a plurality of batteries connected in series or parallel. While two batteries 160, 165 are illustrated, the presently disclosed subject matter is not limited to use with two batteries (or battery banks). Rather, two or more batteries or banks may be used according to principles of the presently disclosed subject matter. In implementations with more than two batteries or banks, the number of required relays may increase proportionally. Each battery may be identical or closely similar in type (e.g. lead acid, gel, AGM, NiCd, NiZn, NiMH, or lithium-ion), capacity (ampere hours) and voltage. Each battery or bank should have sufficient capacity and voltage to power the converter 110 for powering the load for an acceptable duration while also supplying charging to the idle battery.

A load 155 is connected to the output of the converter 110. The load 155 is a device electrically powered by the System. More specifically, the load 155 is powered by the converter 110 with power conditioned by a power conditioner 150. The power conditioner 150 conditions both the output current and output voltage of the converter 110. Non-limiting examples of such loads may include a motor, pump, compressor, electric tool, electric appliance, a DC-AC inverter, or any other electrically operated device that can be powered from current at the voltage available at the output. As particular examples, a marine trolling motor, an electric forklift, and an electric golf cart may receive electric power from a system according to principles of the presently disclosed subject matter. In each case, the System substantially improves duration of operation by increasing battery life while improving the overall performance of the powered load. Improved overall performance results from conditioned power being optimally supplied according to the requirements of the load 155. Controlling the manner and duration of power supplied to a load extends the lifetime of a battery by avoiding the highly detrimental effects of deep discharging.

A bank of relays 140 alternates the mode of operation of each battery. The bank of relays 140 includes a plurality of relays 120-135 for coupling batteries to the input and output of the converter 110. A pair of relays is provided for each battery 160, 165. One relay for each battery selectively couples a battery to the input of the converter 110. Illustratively, in FIG. 2A, relay 120 selectively couples battery A 160 to the input of the converter 110. Likewise, relay 125 selectively couples battery B 165 to the input of the converter 110. Such a relay is referred to as a load relay because the associated battery powers the load 155. The other relay associated with each battery selectively couples a battery to the output from the converter 110. For example, relay 130 selectively couples output from the converter 110 to battery A 160. Likewise, relay 135 selectively couples output from the converter 110 to battery B 165. Such a relay is referred to as a charge relay because the associated battery receives charge from the converter 110. In sum, relay 120 is a load relay associated with battery A 160; relay 125 is a load relay associated with battery B 165; relay 130 is a charge relay associated with battery A 160; and relay 135 is a charge relay associated with battery B 165.

A microcontroller 105 selectively controls the relays 120-135 according to programmed logic imbedded in a switching algorithm. Each relay 120-135 is communicatively coupled to a control signal pin of the microcontroller 105. The microcontroller 105 outputs low power control signals to the relays 120-135 according to the switching algorithm.

In an exemplary embodiment, each relay is normally open, meaning the circuit across the relay is normally disconnected or broken and the relay is said to be deactivated. The circuit across the relays is made (i.e. completed) and the relay is activated when a control signal is supplied to the normally open relay. When a relay is activated it is said to be switched "on" and the circuit is completed across the relay. When the control signal is no longer supplied to the relay, the relay is deactivated, and the relay is said to be switched "off," with the circuit across the relay being broken.

According to one exemplary switching algorithm, a load relay associated with a battery is not activated when a load relay for another battery is activated. In other words, only one load relay is activated at a time. Similarly, a charge relay associated with a battery is not activated when a charge relay for another battery is activated. In other words, only one charge relay is activated at a time. Furthermore, a load relay associated with a battery is not activated when a charge relay for that battery is activated. That is to say, either the load relay or the charge relay associated with a battery is activated at a time, but never both. According to the exemplary switching algorithm, when the load relay 120 for battery A 160 is activated, the charge relay 130 for battery A 160 is deactivated, the load relay 125 for battery B 165 is deactivated and the charge relay 135 for battery B 165 is activated. By contrast, when the load relay 125 for battery B 165 is activated, the charge relay 135 for battery B 165 is deactivated, the load relay 120 for battery A 160 is deactivated and the charge relay 130 for battery A 160 is activated.

According to an exemplary switching algorithm, a relay may be activated or deactivated upon the occurrence of a determined event or condition. For example, each load relay 120, 125 may be activated for a determined period of time in an alternating fashion. Illustratively, load relay 120 may be activated for X seconds. After the X seconds, load relay 120 may be deactivated and load relay 125 may be activated for X seconds. Then load relay 125 may be deactivated after the X seconds and load relay 120 may be activated for X seconds, and so on. This cycle may repeat for as long as the system is in use. In an exemplary embodiment, the period of time (X) may be about 10 to 300 seconds. In a particular preferred embodiment the period of time (X) is about 30 to 60 seconds, such as but not limited to 51 seconds. The time duration may be determined empirically from a plurality of trials, with the selected duration prolonging battery life by maintaining a useful state of charge for a relatively longer duration. In this embodiment, the elapsed determined period of time is a "switching event."

In another implementation, the switching algorithm may deactivate all relays when the voltage of a battery increases above a predetermined amount, or when the voltage of the batteries decreases by a predetermined amount, or when some other measurable parameter (e.g. current, state of charge, heat, etc . . . ) of a battery changes by a predetermined amount, or exceeds or drops below a limit. In this embodiment, the detected parameter is a "termination event."

Each load relay 120, 125 and charge relay 130, 135 may comprise a solid-state relay that is responsive to a control signal provided by the microcontroller 105, such as a relay based upon a single metal-oxide-semiconductor field-effect transistor (MOSFET) or multiple MOSFETs in a paralleled array, which work well for DC loads. However, relays other than solid state relays may be used without departing from the scope of the presently disclosed subject matter.

A DC-DC step-up converter (also known as a boost converter) 110 is coupled to the relays 120-135 of the bank of relays 140 as described above. A battery 160, 165, through an activated load relay 120, 125, is connected to input terminals of the converter 110. Output voltage of the converter 110 is greater than the input voltage. By way of example, an input voltage of about 12 volts may be increased to an output voltage of up to 14.5 volts, with an input current internally limited to about 50 amps, and an output current slightly reduced to about 35 to 40 amps. The output voltage may be adjusted (e.g. dialed down) using a potentiometer in or coupled to the converter 110. In an exemplary implementation, the output voltage is dialed down to a voltage suitable for efficient operation of the load 155. A non-limiting example of a suitable converter is a DCDC6350-SU-ADJ step-up DC/DC converter by Zahn Electronics, Inc. of Franksville, Wis., which accepts input of 12 to 48 volts. Other input-output voltage and current requirements can be accommodated by combining converters and batteries configured to supply output voltage and current sufficient to power a given load and to provide power for charging an idle battery. The converter characteristics and battery capacities are selected based on the particular output voltage and current requirements.

A controller (i.e. microcontroller) 105 receives, stores and processes signals and data and generates analog and digital output. The microcontroller 105 comprises a processor core, memory, clock, analog-to-digital converter (ADC), digital-to-analog converter (DAC) and programmable input/output pins. The pins are software configurable to either an input or an output state. Configured to an output state, the microcontroller 105 pins can drive and control external devices such as relays 120-135. When configured to an input state, the pins may be used to read sensors or external signals, such as signals from voltmeters, ammeters, ohmmeters, temperature sensors and the like. An analog-to-digital converter (ADC) converts incoming analog signals into a digital form that the microcontroller 105 can recognize. A digital-to-analog converter (DAC) allows the microcontroller to output analog signals or voltage levels.

In operation, the microcontroller 105 controls the relays 120-135 by supplying control signals to the relays 120-135 through the output pins of the microcontroller 105. Relays 120 and 125 control which battery supplies power to the converter 110 input; relays 130 and 135 control which battery receives charging current from the converter 110 output. For example, the microcontroller 105 may activate load relay 120 for 51 seconds, then deactivate load relay 120 and activate load relay 125 for 51 seconds, then deactivate load relay 125 and activate load relay 120 for 51 seconds, and so on repeating the cycle.

A power conditioner 150 is coupled between the output from the converter 110 and the load 155 and between the charge relays 130 and 135. The power conditioner 150 improves the quality of the power that is delivered to electrical load 155 and the charge relays 130 and 135. The conditioner 150 delivers consistent voltage of optimized level and characteristic to the load 155 and for the proper function of charge relays 130, 135, despite fluctuations at the output of the converter 110. Such fluctuations may derive from the DC-DC conversion process as well as from switching between load relay 120 and load relay 125 to alternately use batteries A 160 and B 165 to supply power to the converter 110. In one embodiment, the power conditioner 150 may comprise a voltage regulator. In another embodiment, the conditioner 150 may comprise a reservoir capacitor, used to smooth the output from the converter 110. A non-limiting example of such a capacitor is a 100,000 µF capacitor. Such a capacitor can shunt away and conceal current and/or voltage fluctuations from the converter 110.

Diode 170 allows current to pass in the direction of the converter 110 from an active battery 160, 165 when a load relay 120, 125 is activated. The diode 170 exhibits asymmetric conductance, with very low resistance to current flow in the direction of the converter 110 from the load relay 120, 125, and very high (ideally infinite) resistance in the opposite direction. This configuration blocks potentially damaging current from flowing back into the system from the converter 110.

Heat generated by the electronic devices and circuitry is dissipated to improve reliability and prevent premature failure. Techniques for heat dissipation include heat sinks and fans for air cooling. A forced air cooling system is preferred. As shown in FIG. 2A, a fan 115 may be coupled to the controller 105. Optionally, thermal sensors and/or limit switches may be provided to determine when a fan 115 should be activated and/or to determine when the system risks overheating and should be shut down. Each heat sink is a metal structure with one or more flat surfaces to ensure good thermal contact with the components to be cooled, and an array of comb or fin like protrusions to increase the surface contact with the air, and thus the rate of heat dissipation. The fan 115 increases the rate of airflow over each heat sink to maintain a large temperature gradient by replacing warmed air faster than convection alone would enable.

An electronic visual display 145 is operably coupled to the microcontroller 105. The display 145 visually displays operating information such as voltages, currents, times and temperatures measured, tracked and/or detected by the system. The display 145 may also indicate operating states. The display 145 may also present calculated or estimated values, such as states of charge, based upon sensed parameters.

Optionally, a current divider circuit may be disposed between power conditioner 150, load 155 and charge relays 130, 135, to control the current supplied for recharging batteries 160, 165 from the available current from the power conditioner 150. The current divider circuit may be adjustable with one or more variable resistors and/or variable capacitors. A non-limiting example of a current divider circuit is a linear parallel circuit that produces a current in branches, wherein the branches have a resistor or capacitor, and the branch current is a fraction of the input current, and the sum of all currents in all branches equals the input current.

Figure 2B:
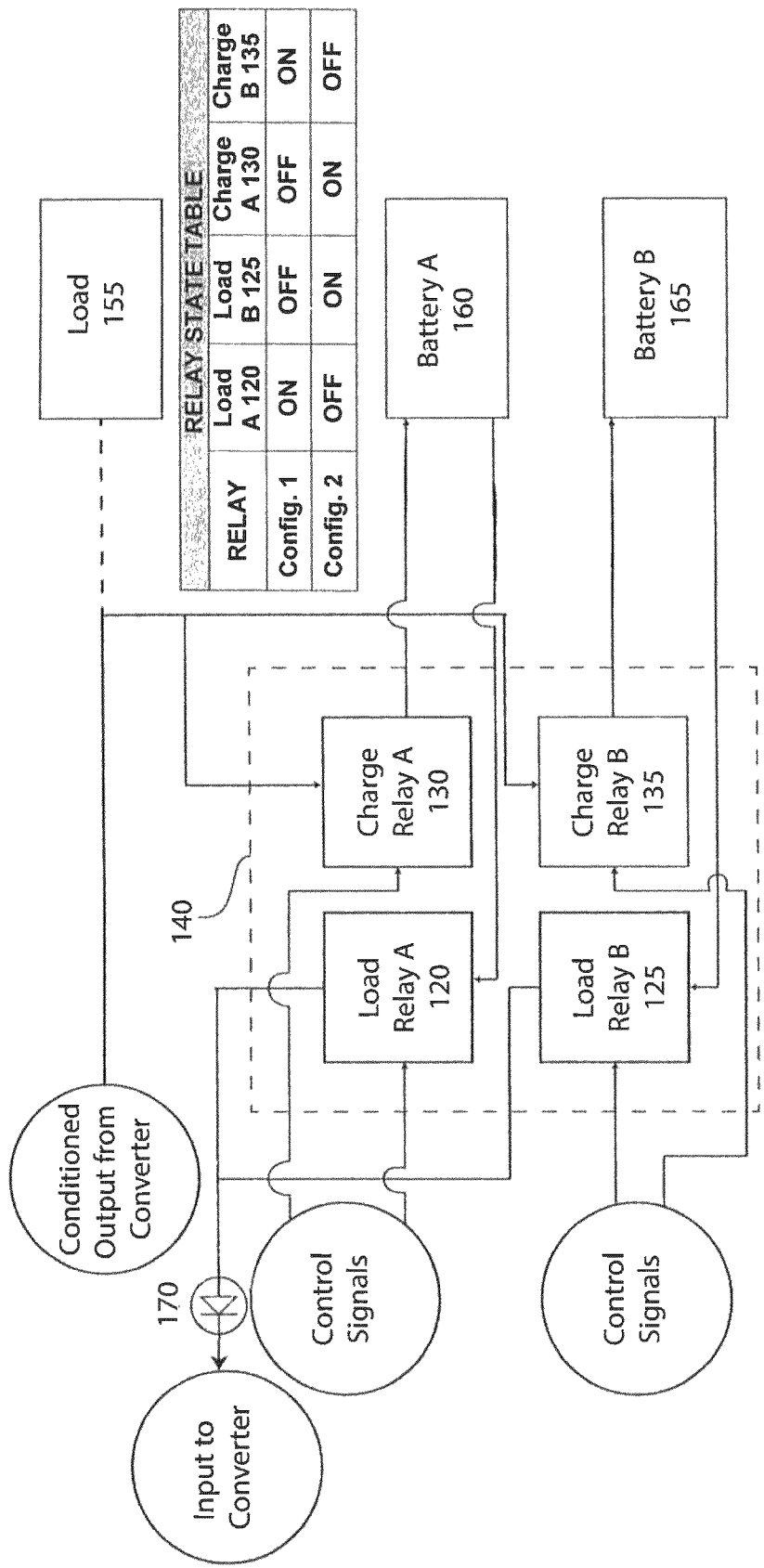
FIG. 2B is a high level block diagram of an exemplary relay bank for the exemplary circuit of FIG. 2A.

Referring now to FIG. 2B, a magnified or enlarged view of the bank of relays 140 is provided to more clearly illustrate the couplings. Relay states (ON being "activated" and OFF being "deactivated") are shown in the accompanying Relay State Table. Each relay 120-135 receives a control signal from the microcontroller 105. Load relays A 120 and B 125 are each coupled between their respective battery (battery A 160 or battery B 165) and the input to the converter 110. Charge relays A 130 and B 135 are each coupled between the conditioned power received from the power output of the converter 110 and their respective battery (battery A 160 or battery B 165). In configuration 1, load relay A 120 is activated, load relay B 125 is deactivated, charge relay A 130 is deactivated, and charge relay B 135 is activated unless battery B 165 is fully charged. If battery B 165 is fully charged, it cannot benefit from and may be damaged by additional charging. Assume at start batteries A 160 and B 165 are both fully charged. If battery A 160 is first coupled through load relay A 120 to the input of the converter 110, then charge relay B 135 will not be activated because battery B 165 is fully charged. Charge relay B 135 will only be activated if battery B 165 is not fully charged and can benefit from receiving charging from battery A 160 that is coupled through load relay A 120 to the input of the converter 110. In configuration 2, load relay A 120 is deactivated, load relay B 125 is activated, charge relay B 135 is deactivated, and charge relay A 130 is activated unless battery A 160 is fully charged. If battery A 160 is fully charged, it cannot benefit from and may be damaged by additional charging. Charge relay A 130 will be activated only when battery A 160 is not fully charged and can benefit from receiving charging from battery B 165 that is coupled through load relay B 125 to the input of the converter 110.

Figure 3:
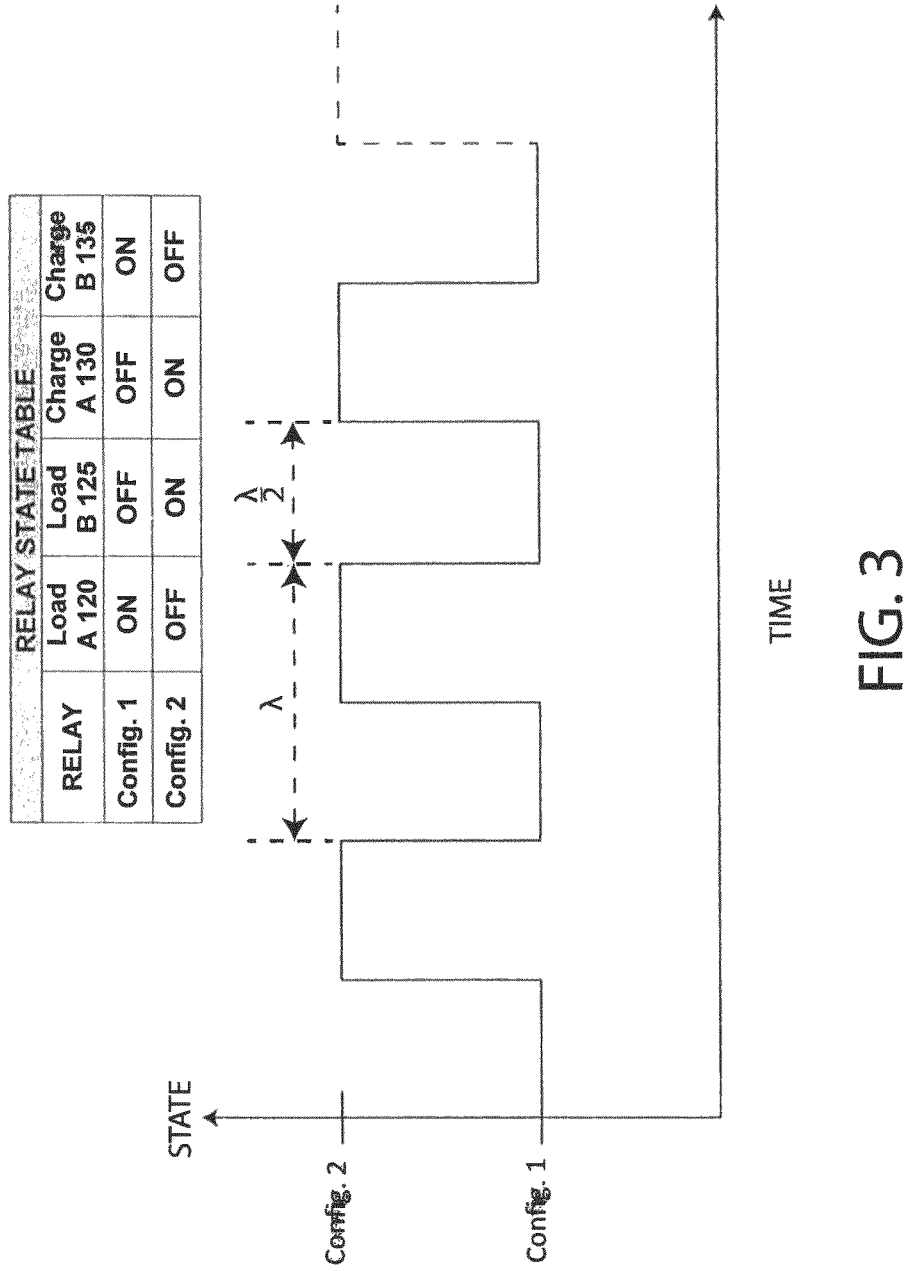
FIG. 3 is an exemplary relay state timing graph for an exemplary relay bank for the exemplary circuit of FIG. 2A.

Referring now to FIG. 3, a state graph is provided. The graph illustrates a relay bank operating alternately in configuration 1 and configuration 2. The pattern cycles repeatedly until the process is terminated. Switching between configuration 1 and configuration 2 entails activating and deactivating relays. In the illustrated example, in configuration 1, load relay A 120 is activated, load relay B 125 is deactivated, charge relay A 130 is deactivated and charge relay B 135 is activated. Also in the illustrated example, in configuration 2, load relay A 120 is deactivated, load relay B 125 is activated, charge relay A 130 is activated and charge relay B 135 is deactivated. The alternating configurations repeat in cyclical fashion in the illustrated example, with each state being maintained for a determined period of time, $\lambda/2$. In one non-limiting example, $\lambda/2$ may equal about 51 seconds. In alternative implementations, each state may be maintained for a variable time duration determined by any of various means, such as an algorithm, sensed condition, empirical data or user input. Thus, states may be maintained for uniform or non-uniform time durations, without departing from the scope of the presently disclosed subject matter. In an exemplary implementation, the determined duration will provide a battery life for the batteries which appreciably exceeds the battery life attainable when not using a system according to the presently disclosed subject matter.

Figure 4:
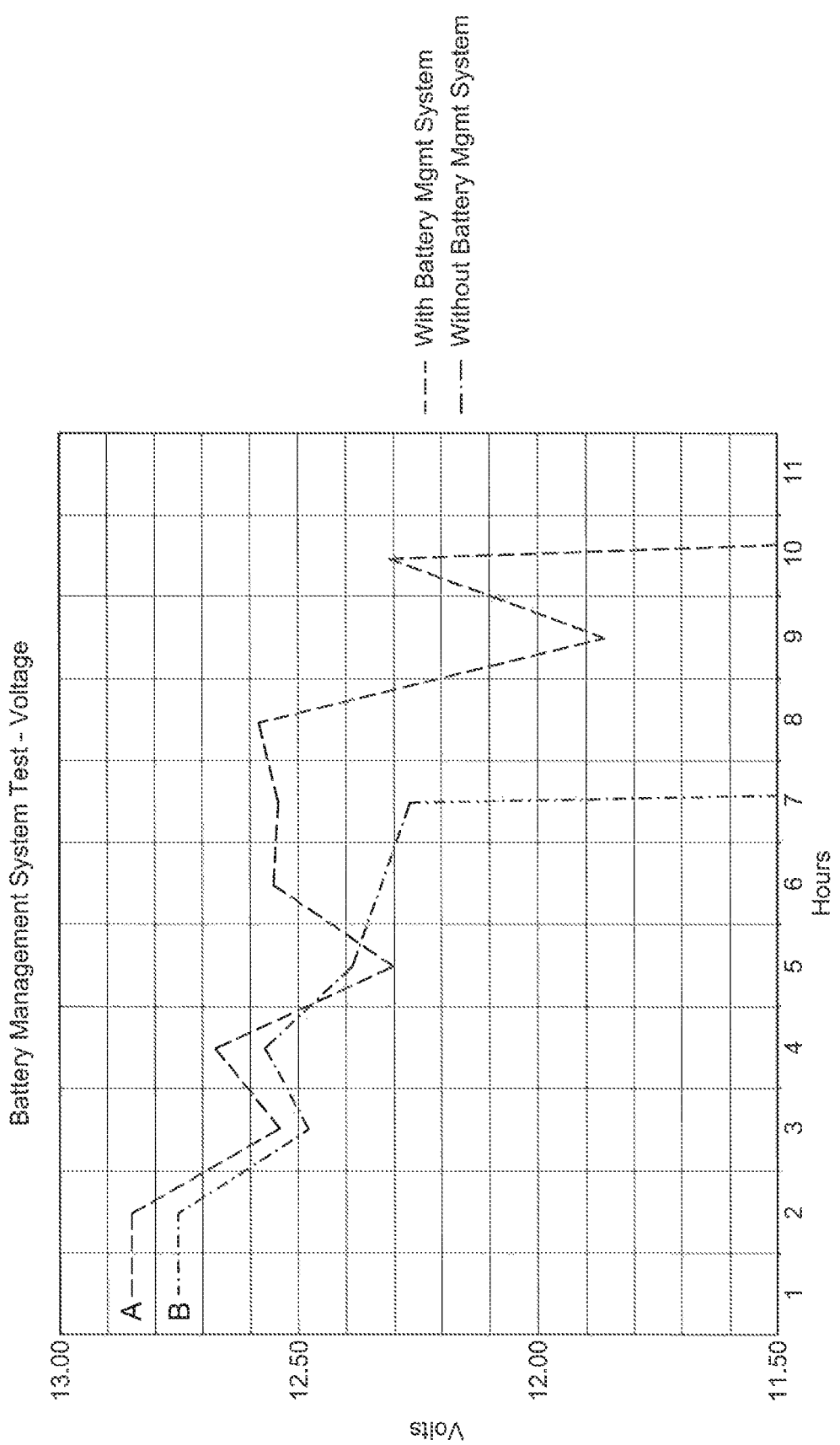
FIG. 4 is an exemplary voltage drop over time comparison for the exemplary circuit of FIG. 2A portraying battery life where the System is in use (Line A) as opposed to battery life where the System is in not use (Line B)

Referring now to FIG. 4, when loading a battery in accordance with principles of the presently disclosed subject matter, the battery's state of charge declines. However, when the battery is idle, it receives charging. By charging the idle battery in accordance with principles of the presently disclosed subject matter, the battery's state of charge is maintained at higher levels. This higher level of state of charge delays the onset of rapid decline in battery voltage. Tests were performed using identical pairs of EverStart® size 29DC 12 volt deep cycle lead acid marine batteries by Wal-Mart Stores, Inc. rated for 845 Marine Cranking Amps and 122 Amp-Hours battery life expectancy. System One consisted of Batteries A-1 and A-2, a Motor Guide R3 12 volt 30 pound thrust trolling motor, and battery management system according to principles of the presently disclosed subject matter. System Two consisted of Batteries B-1 and B-2 and a Motor Guide R3 12 volt 30 pound thrust trolling motor. Testing was conducted with batteries in fully charged state at the start of the test. The motors were turned on and allowed to run continuously. In one hour increments during the test, simultaneous readings were taken to measure the amperage and voltage of the batteries of System One and the batteries of System Two. Comparison of the results of battery life of System One and results of battery life of System Two are reflected in FIG. 4. System One, represented by line A, provided sufficient power to operate the load for slightly more than nine and ½ hours, while System Two, represented by line B, provided sufficient power to operate the load for approximately six and ½ hours. Thus, the presently disclosed subject matter maintained a higher state of charge in the batteries of System One, increasing battery life by approximately three hours or forty-six percent (46%).

Figure 5:
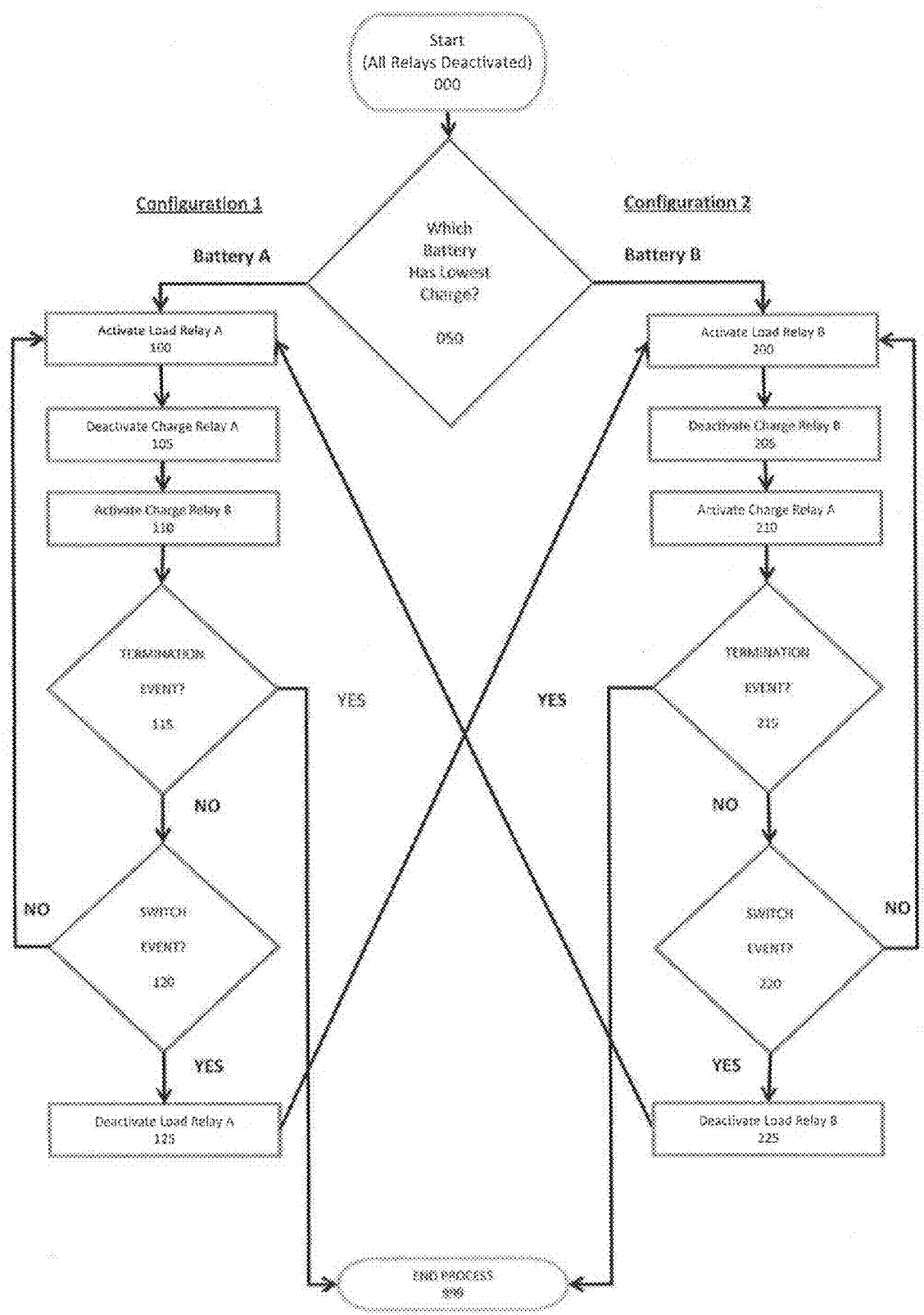
FIG. 5 is a high level flowchart for an exemplary relay state switching process according to principles of the presently disclosed subject matter.

Referring now to FIG. 5, a high level flowchart for an exemplary relay state switching process according to principles of the presently disclosed subject matter is presented. The exemplary process applies to a system with two batteries or battery banks and pairs of relays for each, such as the system described in FIGS. 2A and 2B. One battery or battery bank is designated battery A. The relays associated with battery A include a load relay A and a charge relay A. The other battery or battery bank is designated battery B. The relays associated with battery B include a load relay B and a charge relay B. When activated, each load relay couples its associated battery to the input of a DC-DC converter. When activated, each charge relay couples the conditioned output from a DC-DC converter, which is also powering a load, to the battery associated with the activated charge relay. When battery A is coupled to the input of a DC-DC converter by load relay A, the system is said to be in configuration 1. Conversely, when battery B is coupled to the input of a DC-DC converter by load relay B, the system is said to be in configuration 2. The process entails steps for alternating the relay states in cyclical fashion, allowing one battery supply power for a load and charging for the other battery (configuration 1), and then reversing the roles so that the other battery now supplies power for the load and charging to the other battery (configuration 2), and continuously repeating the cycle until the process is terminated.

Accordingly, with reference to FIG. 5, in Step 050 the system determines which battery has the lowest charge. FIG. 5 assumes the system begins at Start 000, with both batteries fully charged and all relays in the open or deactivated mode. In Step 050 the system determines which battery has the lowest charge. Since both batteries are fully charged, the system passes control sequentially to Step 100 and activates load relay A, Step 105 which deactivates charge relay A, and Step 110 which activates charge relay B. At this point, battery A is powering the load and providing charging to battery B unless battery B is fully charged. The system then passes control to Step 115 where the system determines if a termination event has occurred. If a termination event has occurred, the system passes control to Step 999 and the process is ended. If a termination event has not occurred, control is passed to Step 120 where the system determines if a switching event has occurred. If a switching event has not occurred, control is passed back to Step 100 and the system repeats the same progression of steps again. If a switching event has occurred, the system passes control to Step 125 which deactivates load relay A. The system then transitions to configuration 2 by passing control to Step 200.

Now in configuration 2, Step 200 activates load relay B, and then passes control sequentially to Step 205 which deactivates charge relay B, then to Step 210 which activates charge relay A. At this point, battery B is powering the load and providing charging to battery A unless battery A is fully charged. The system then passes control to Step 215 where the system determines if a termination event has occurred. If a termination event has occurred, the system passes control to Step 999 and the process is ended. If a termination event has not occurred, control is passed to Step 220 where the system determines if a switching event has occurred. If a switching event has not occurred, control is passed back to Step 200 and the system repeats the same progression of steps again. If a switching event has occurred, the system passes control to Step 225 which deactivates load relay B. The system then transitions to configuration 1 by passing control to Step 100.

In Steps 115 and 215, the system determines if a termination event has occurred. If a termination event has occurred, control is passed to Step 999 where the process is ended. A termination event may be any event, condition or parameter that can be determined by the system and warrants terminating the process. A non-limiting example is a battery voltage below a determined lower limit, switching off a powered load or user intervention. By ending the process when a low voltage limit is reached, a deep discharge that adversely affects the lifetime of the battery may be avoided.

In Steps 120 and 220, the system determines if a switching event has occurred. If a switching event has occurred, control is passed to Step 200 if switching to configuration 2 or to Step 100 if switching to configuration 1. A switching event may be any event, condition or parameter that warrants switching from configuration 1 to configuration 2 and vice-versa. A non-limiting example of a switching event is an elapsed time or a drop in voltage or current. By changing relay states and thus configuration states when a switching event occurs, battery life is prolonged.

Those of ordinary skill in the art will understand and appreciate from the complete disclosure herewith that the flowchart of FIG. 5 provides a complete basis, along with the present disclosure, of information needed for such a person of skill to prepare a suitable algorithm for operation of controller 105. It is also to be understood that controller 105 may comprise a microcontroller or any combination of hardware/software (known existing or later developed) suitable for carrying out the functionalities in the configurations described herein, for supplying relay control signals, based on inputs and events as otherwise described herein.

While an exemplary embodiment of the presently disclosed subject matter has been described, it should be apparent that modifications and variations are possible to adapt to the requirements of a myriad of applications, all of which fall within the true spirit and scope of the presently disclosed subject matter. With respect to the above description then, it is to be realized that the optimum relationships for the components and steps of the presently disclosed subject matter, including variations in order, form, content, function and manner of operation, are deemed readily apparent and obvious to one skilled in the art, and all equivalent relationships to those illustrated in the drawings and described in the specifications are intended to be encompassed by the presently disclosed subject matter. The above description and drawings illustrate the modifications that can be made without departing from the presently disclosed subject matter, the scope of which is to be limited only by the following claims. Therefore, the foregoing is considered as illustrative only of the principles of the presently disclosed subject matter. Further, since numerous modifications and changes will readily occur to those skilled in the art, it is not desired to limit the presently disclosed subject matter to the exact construction and operation shown and described, and accordingly, all suitable modifications and equivalents are intended to fall within the scope of the presently disclosed subject matter as claimed.

What is claimed is:

1. A battery power supply system, comprising:
    a DC-DC step-up converter having a power input and a power output, said DC-DC step-up converter receiving an input current at an input voltage through said power input and delivering an output current at an output voltage at said power output for powering a load electrically coupled to said power output, with said output voltage being greater than said input voltage;
    a plurality of rechargeable batteries, including a first battery and a second battery; and
    a pair of relays respectively associated with and electrically coupled to each of said plurality of batteries, each relay being switchable from an activated state that makes a circuit through a relay and a deactivated state that breaks a circuit through a relay;
    wherein each of said pair of relays includes a load relay and a charge relay, respectively, for each associated battery, with said load relay for each associated battery electrically coupling its associated battery to said power input of said DC-DC step-up converter when said load relay is in its activated state, and with said charge relay electrically coupling its associated battery to said power output of said DC-DC step-up converter when said charge relay is in its activated state, with said load relay for an associated battery not being in its activated state when said paired charge relay for the same associated battery is in its activated state, and said charge relay for the same associated battery not being in its activated state when said paired load relay for the same associated battery is in its activated state; and
    said system further includes a microcontroller communicatively coupled to each of said relays, and selectively supplying control signals according to an embedded switching algorithm to each of said relays, for switching said relays between said activated state and deactivated state thereof, so as to cycle said relays alternately between a first configuration and a second configuration thereof, for prolonging battery life by powering a load electrically coupled to said power output with one of said batteries while charging the other of said batteries not being used to power the associated load.

2. A battery power supply system as in claim 1, wherein said microcontroller is configured so that:
    when the battery power supply system is in the first configuration thereof,
        (a) said microcontroller supplies a first load control signal to the load relay for the second battery, said first load control signal switching the load relay for the second battery to the deactivated state,
(b) said microcontroller supplies a second load control signal to the load relay for the first battery, said second load control signal switching the load relay for the first battery to the activated state,
(c) said microcontroller supplies a first charge control signal to the charge relay for the first battery, said first charge control signal switching the charge relay for the first battery to the deactivated state,
(d) said microcontroller supplies a second charge control signal to the charge relay for the second battery, said second charge control signal switching the charge relay for the second battery to the activated state,
whereby the first battery load relay in the activated state electrically couples the first battery to the power input of the DC-DC step-up converter when the load relay for the second battery is in the deactivated state, and the charge relay for the second battery in the activated state electrically couples the second battery to the power output of the DC-DC step-up converter when the charge relay for the first battery is in the deactivated state, said second battery, unless fully charged, receiving charging from the power output of the DC-DC step-up converter when the charge relay for the second battery is in the activated state while the power output of the DC-DC step-up converter powers the load; and when the battery power supply system is in the second configuration thereof,
(a) said microcontroller supplies a first load control signal to the load relay for the first battery, said first load control signal switching the load relay for the first battery to the deactivated state,
(b) said microcontroller supplies a second load control signal to the load relay for the second battery, said second load control signal switching the load relay for the second battery to the activated state,
(c) said microcontroller supplies a first charge control signal to the charge relay for the second battery, said first charge control signal switching the charge relay for the second battery to the deactivated state, and
(d) said microcontroller supplying a second charge control signal to the charge relay for the first battery, said second charge control signal switching the charge relay for the first battery to the activated state,
whereby the second battery load relay in the activated state electrically couples the second battery to the power input of the DC-DC step-up converter when the load relay for the first battery is in the deactivated state, and the charge relay for the first battery in the activated state electrically couples the first battery to the power output of the DC-DC step-up converter when the charge relay for the second battery is in the deactivated state, said first battery, unless fully charged, receiving charging from the power output of the DC-DC step-up converter when the charge relay for the first battery is in the activated state while the power output of the DC-DC step-up converter powers the load.

3. A battery power supply system as in claim 1, wherein: said load relay for the first battery is in its activated state when said charge relay for the second battery is in its activated state, said load relay for the second battery is in its activated state when said charge relay for the first battery is in its activated state, said load relay for the first battery is not in its activated state when said load relay for the second battery is in its activated state and said load relay for the second battery is not in its activated state when said load relay for the first battery is in its activated state; and
said charge relay for the first battery is not in its activated state when said charge relay for the second battery is in its activated state, and said charge relay for the second battery is not in its activated state when said charge relay for the first battery is in its activated state.

4. A battery power supply system as in claim 2, wherein said microcontroller is communicatively coupled to each of said relays and further configured for deactivating each relay associated with and electrically coupled to each battery upon the occurrence of a termination event.

5. A battery power supply system as in claim 2, wherein said microcontroller is communicatively coupled to each of said relays and further configured for deactivating all relays associated with and electrically coupled to all batteries upon the occurrence of a termination event.

6. A battery power supply system as in claim 2, further comprising a power conditioner electrically coupled to said power output of said DC-DC step-up converter between each charge relay and said power output, and between the associated load and said power output, said power conditioner conditioning the output current and output voltage from the power output, and with an associated load and charge relay in an activated state receiving the conditioned output current and voltage from the power conditioner.

7. A battery power supply system as in claim 2, further comprising a diode electrically coupled between said load relays and said DC-DC step-up converter, said diode allowing current to pass in a direction from said load relay to said converter while impeding current from passing from said converter to said load relay.

8. A battery power supply system as in claim 2, wherein said microcontroller is further configured for cycling the relays from the first configuration to the second configuration upon the occurrence of a switching event.

9. A battery power supply system as in claim 8, wherein said switching event comprises a determined period of time.

10. A battery power supply system as in claim 8, wherein said switching event comprises a voltage change in one of the batteries.

11. A battery power supply system as in claim 8, wherein said switching event comprises a detected battery voltage below a determined limit in one of said batteries.

12. A battery power supply system as in claim 8, wherein said switching event comprises a detected battery voltage above a determined limit in one of said batteries.

13. A battery power supply system as in claim 8, wherein said switching event comprises a user-defined event, condition or parameter.

14. A battery power supply system as in claim 2, wherein said microcontroller is further configured for deactivating each relay associated with and electrically coupled to each battery upon the occurrence of a termination event.

15. A battery power supply system as in claim 14, wherein said termination event comprises a determined period of time.

16. A battery power supply system as in claim 14, wherein said termination event comprises a battery voltage detected below a determined limit.

17. A battery power supply system as in claim 14, wherein said termination event comprises a battery voltage detected above a determined limit.

18. A battery power supply system as in claim 14, wherein said termination event comprises a user-defined event, condition or parameter.

19. A method of supplying power using a plurality of batteries, said method comprising the steps of:
- in a first configuration, electrically connecting a first battery to the input of a DC-DC step-up converter, said DC-DC step-up converter receiving an input current at an input voltage through the input and delivering power at an output current at an output voltage through the output, said output voltage being greater than the input voltage; electrically connecting a load and a second battery to the output of the DC-DC step-up converter, the output of the DC-DC step-up converter powering the load and providing charging to the second battery;
- determining if a first switching event has occurred, and if a first switching event has occurred, then switching from a first configuration to a second configuration, and in the second configuration, electrically disconnecting the first battery from the input of the DC-DC step-up converter, electrically disconnecting the second battery from the output of the DC-DC step-up converter, electrically connecting the second battery to the input of the DC-DC step-up converter, and electrically connecting the first battery to the output of the DC-DC step-up converter, and remaining in the second configuration until a second switching event has occurred; and
- determining if a second switching event has occurred, and if a second switching event has occurred, then switching from a second configuration to a first configuration, and in the first configuration, electrically disconnecting the second battery from the input of the DC-DC step-up converter, electrically disconnecting the first battery from the output of the DC-DC step-up converter, electrically connecting the first battery to the input of the DC-DC step-up converter, and electrically connecting the second battery o the output of the DC-DC step-up converter, and remaining in the second configuration until a first switching event has occurred;
- wherein in the first and second configurations, the first battery is not electrically connected to the input of the DC-DC step-up converter when the second battery is electrically connected to the input of the DC-DC step-up converter, the second battery is not electrically connected to the input of the DC-DC step-up converter when the first battery is electrically connected to the input of the DC-DC step-up converter; the first battery is not electrically connected to the output of the DC-DC step-up converter when the second battery is electrically connected to the output of the DC-DC step-up converter, and the second battery is not electrically connected to the output of the DC-DC step-up converter when the first battery is electrically connected to the output of the DC-DC step-up converter.

20. A method as in claim 19, further comprising cyclically repeating the first configuration after each second configuration switching event and repeating the second configuration after each first configuration switching event.

21. A method as in claim 19, further comprising conditioning power from the output of the DC-DC step-up converter before the power is supplied to the load and the second battery in the first configuration and before the power is supplied to the load and the first battery in the second configuration.

22. A method as in claim 19, further comprising impeding current from passing from the DC-DC step-up converter to the first battery in the first configuration, and impeding current from passing from the DC-DC step-up converter to the second battery in the second configuration.

23. A method as in claim 19, wherein said first switching event comprises a first determined period of time.

24. A method as in claim 19, wherein said second switching event comprises a second determined period of time.

25. A method as in claim 19, wherein said first switching event and said second switching event comprise a voltage condition, respectively, in the first and second batteries.

26. A method as in claim 19, wherein said first switching event and said second switching event comprise a user-defined event, condition or parameter.

27. A method as in claim 19, further comprising electrically disconnecting each of the first and second batteries from the DC-DC step-up converter upon the occurrence of a termination event.

* * * * *

UNITED STATES PATENT AND TRADEMARK OFFICE
CERTIFICATE OF CORRECTION

PATENT NO. : 9,214,826 B2
APPLICATION NO. : 14/078776
DATED : December 15, 2015
INVENTOR(S) : Clint L. Skipper It is certified that error appears in the above-identified patent and that said Letters Patent is hereby corrected as shown below:

In the claims

In Column 15, Line 37, delete "o" and insert therefor --of--

Signed and Sealed this
Seventh Day of June, 2016

Michelle K. Lee
*Director of the United States Patent and Trademark Office*